(12) United States Patent
Plunkett

(10) Patent No.: US 7,013,574 B2
(45) Date of Patent: Mar. 21, 2006

(54) SAW BLADE DEPTH GAUGE

(76) Inventor: Tai Plunkett, 9717 La Tuna Canyon Rd., Sun Valley, CA (US) 91352

(*) Notice: Subject to any disclaimer, the term of this patent is extended or adjusted under 35 U.S.C. 154(b) by 0 days.

(21) Appl. No.: 10/937,996

(22) Filed: Sep. 10, 2004

(65) Prior Publication Data

US 2005/0076525 A1    Apr. 14, 2005

Related U.S. Application Data

(60) Provisional application No. 60/510,877, filed on Oct. 14, 2003.

(51) Int. Cl.
B27G 23/00 (2006.01)

(52) U.S. Cl. .......................... 33/640; 33/832
(58) Field of Classification Search ............ 33/640, 33/755, 759, 760, 832, 833, 626, 628, 633, 33/634, 641, 494
See application file for complete search history.

(56) References Cited

U.S. PATENT DOCUMENTS

| | | | |
|---|---|---|---|
| 1,624,779 A * | 4/1927 | De Camp et al. .............. 33/759 |
| 1,687,649 A | 10/1928 | Gillett | |
| 2,539,831 A * | 1/1951 | Hacker ........................ 33/628 |
| 2,696,854 A | 12/1954 | Woodruff | |
| 2,822,623 A | 2/1958 | Legois | |
| 3,201,873 A | 8/1965 | Bell et al. | |
| 3,205,586 A | 9/1965 | Mullen | |
| 3,628,496 A | 12/1971 | Schmitt | |
| 3,645,002 A | 2/1972 | Hefti | |
| 3,664,031 A | 5/1972 | Duffy | |
| 4,519,142 A | 5/1985 | Parker | |
| 4,571,840 A | 2/1986 | May | |
| 4,750,270 A * | 6/1988 | Kundikoff ..................... 33/494 |
| 4,779,354 A | 10/1988 | Hill | |
| 4,930,221 A | 6/1990 | Taylor | |
| 5,121,553 A | 6/1992 | Boerder | |
| 5,168,637 A | 12/1992 | Gibson | |
| 5,187,877 A | 2/1993 | Jory et al. | |
| 5,491,906 A * | 2/1996 | Reilly ......................... 33/640 |
| 5,735,058 A * | 4/1998 | Jimenez ....................... 33/494 |
| 6,216,575 B1 | 4/2001 | Dils | |
| 6,263,584 B1 | 7/2001 | Owens | |
| 6,434,852 B1 | 8/2002 | Tarris et al. | |
| 6,543,324 B1 | 4/2003 | Dils | |
| 2001/0013268 A1 | 8/2001 | Dils | |

* cited by examiner

Primary Examiner—Christopher W. Fulton
(74) Attorney, Agent, or Firm—Christie, Parker & Hale, LLP

(57) ABSTRACT

A saw blade depth gauge having a body with a blade height scale and a flexible strip capable of conforming to a perimeter of a saw blade, wherein the flexible strip is connected to the body such that the flexible strip can bend around a perimeter of the saw blade when measuring to obtain a depth measurement on the vertical scale and return to an original position upon removal of the depth gauge from the saw blade. Alternatively, a rigid arc is connected to the body by spring biased posts.

23 Claims, 22 Drawing Sheets

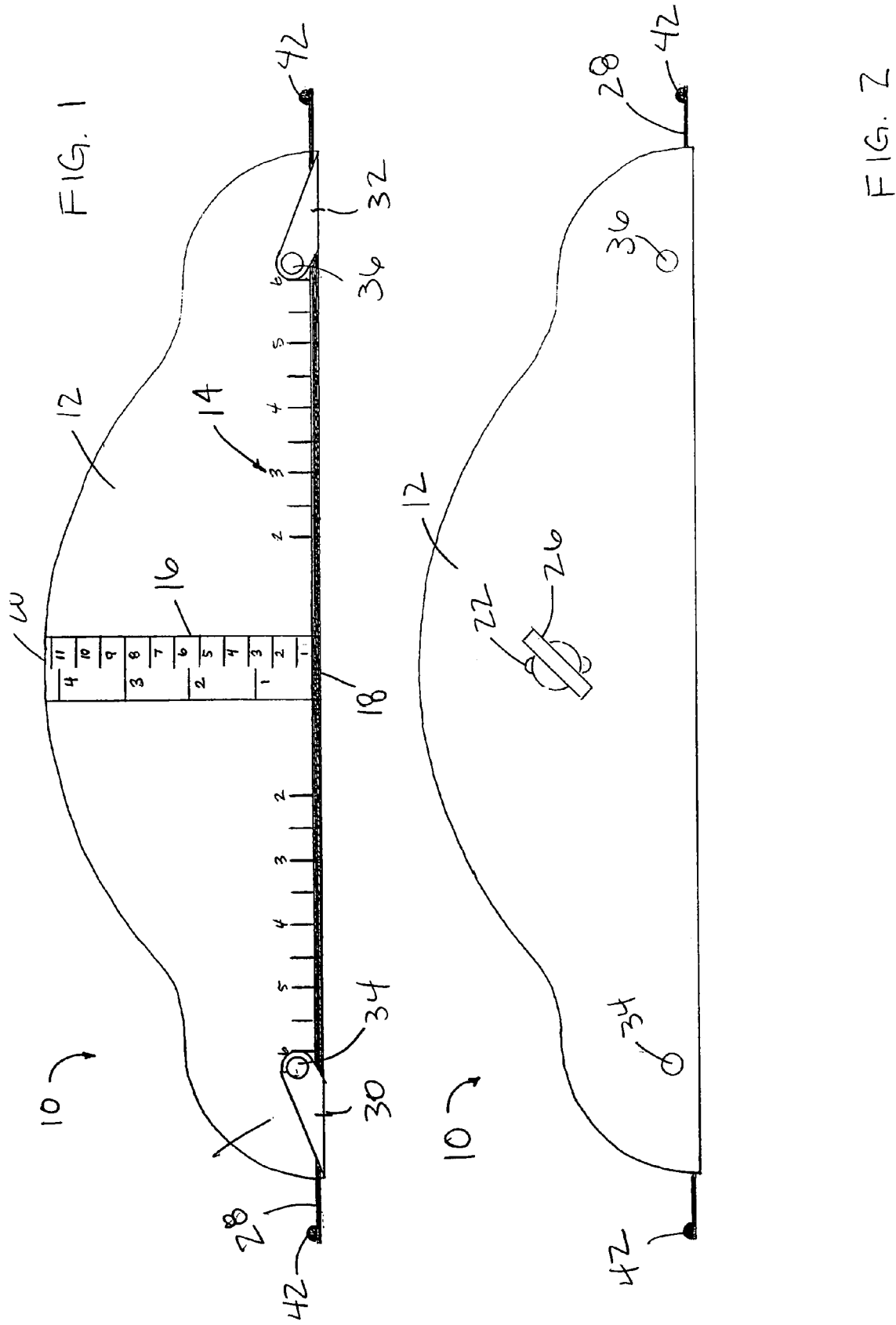

SAW BLADE DEPTH GAUGE

CROSS-REFERENCE TO RELATED APPLICATION(S)

This application claims the benefit of U.S. Provisional Application No. 60/510,877, filed Oct. 14, 2003.

BACKGROUND OF THE INVENTION

This invention relates to gauges, and more specifically, to a gauge used in combination with a table saw, or the like, for accurately measuring the depth of cut of the saw blade by measurement of the projecting portion of the blade above the table.

Setting up a table saw to make accurate cut depths has previously been achieved by a limited number of techniques. Most common of these being either to measure behind the saw blade while raising the saw blade to the desired height, or making a test cut on scrap material, and then making the required adjustments by lowering or raising the blade. Another technique for measuring cut depth is the use of a depth gauge. Previous depth gauges typically are made of metal with fixed fractional measuring increments. Previous gauges function by trying to estimate the exact center of the saw blade, while placing the desired notch on the gauge perpendicular over the saw blade, then raising the blade while turning the blade until one of the saw blade teeth slightly comes into contact with the gauge. Over time, these prior gauges, by contacting the blade, can have a dulling effect on the blade.

Another problem associated with prior measuring devices is that they cannot compensate for table wear, blade diameter, or other variance which arise through usage. Yet another drawback is that prior depth gauges require a test cut in a scrap piece of material, to confirm that the blade is set at the desired depth. This process usually requires several time consuming adjustments to achieve the exact depth of cut desired. In addition, if the saw blade needs to be moved, it is difficult to duplicate the exact same depth prior to moving the blade. Consequently, there is a need for an improved saw blade depth gauge, which will easily and accurately provide an accurate reading, irrespective to changeable factors such as blade diameter and the like without dulling the blade.

SUMMARY OF THE INVENTION

The present invention is directed to a saw blade depth gauge, that will easily and accurately measure the depth of the cut by measuring the height of the blade above the table, without dulling or damaging the blade. The depth gauge comprises a balanced stable body portion, having a blade centering scale along the lower section of the body. The blade centering scale functions as a quick reference, blade centering guide, to provide an accurate estimation of how far the blade will cut into the work piece when the blade reaches full cutting depth. Connected to the body is a vertical adjustable scale, measuring from the bottom of the gauge to the top of the gauge, and able to accommodate the full depth of a 12-inch blade. A non-dulling flexible strip is connected to the body and is long enough to allow full travel of up to a 12-inch blade and is wide enough to be used with dado blades.

The flexible strip is able to conform to the outside circumference of the blade, and is designed to be returned to its original shape when the gauge is removed from the blade. The non-dulling flexible strip is supported to the body by a roller bearing bracket on either end of the gauge. Roller bearings are located above the flexible strip to guide the strip and reduce friction as the strip rides against the roller bearings. The bearings reduce friction of the strip and allow the strip to be raised and lowered as the saw blade is raised and lowered. The flexible strip then acts as an indicator against the vertical adjustable scale on the gauge.

The depth gauge functions by placing it parallel to the saw blade with the flexible strip directly over the saw blade. When the blade is raised, it comes into contact with the bottom of the flexible strip. The flexible strip conforms to the outside circumference of the saw blade, giving the exact arc of the saw blade. The blade is raised until the top of the flexible strip reaches the desired depth, measured by the adjustable scale. The depth gauge of the present invention is extremely accurate, needing only an initial adjustment to set the gauge with respect to the saw blade currently being used in the saw. The initial adjustment is made by picking a reference point on the adjustable scale, for example the one-inch mark, making a test cut in a piece of scrap, then moving and setting the adjustable scale as necessary. The depth gauge is then set to the specific blade being used in the saw, and can be used to measure any necessary changes in height of the blade.

The present invention contemplates various embodiments for attachment and operation of the flexible strip, as will be discussed in more detail herein.

BRIEF DESCRIPTION OF THE DRAWINGS

FIG. 1 is a front view of a depth gauge of the present invention;

FIG. 2 is a back view of the depth gauge of FIG. 1;

DETAILED DESCRIPTION OF THE INVENTION

Figure 3:
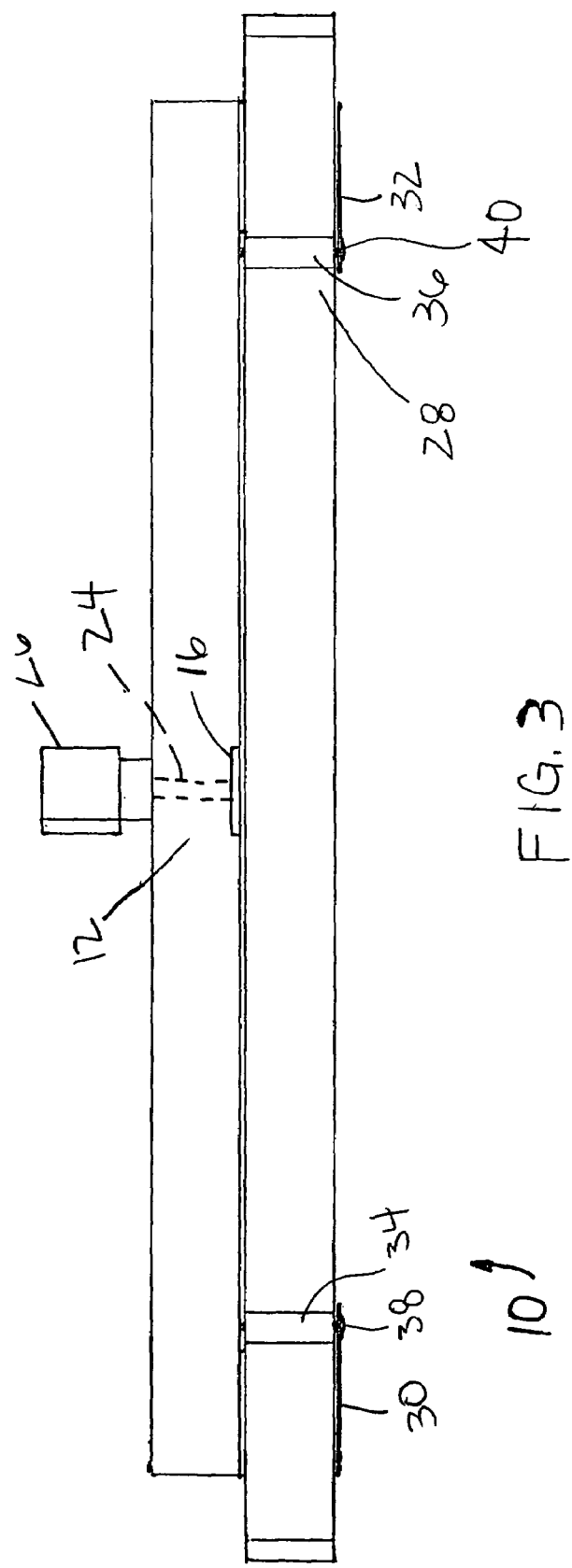
FIG. 3 is a top view of the depth gauge of FIG. 1.

A saw blade depth gauge 10 of the present invention is shown in FIGS. 1 through 3. The depth gauge comprises a body portion 12, having a blade centering scale 14 marked along a lower surface of the body. The scale can be color coded and extends from the center of the gauge outwardly in both directions in equal increments. For example, the scale as shown in FIG. 1 is in ½-inch increments, however, could also be in metric increments. The scale 14 functions as a quick reference blade centering guide to provide an accurate estimation of how far the blade will cut into a work piece when the blade reaches full cutting depth. A vertical adjustable scale 16 extends from a lower surface 18 of the body, to an upper surface 20 of the body and is marked in both inches and metric units. The vertical scale 16 measures from the bottom of the gauge to the top of the gauge and is able to accommodate the full depth of a 12-inch saw blade. The adjustable scale 16 is adjustable by being positioned within a slot 22 which extends through the body 12. The scale 16 is connected to a post 24 and an adjustment knob 26 which is threaded onto post 24 and can be loosened and tightened to move the scale within slot 22.

A non-bowing flexible strip 28 is located adjacent the lower surface 18 of body 12 and is held in position by roller bearing brackets 30 and 32 located on either end of the body 12. The flexible strip 28 is preferably made of plastic, however, other semi-rigid flexible materials can be used. The flexible strip 28 is long enough to allow full travel of up to a 12-inch saw blade and is wide enough to be used with Dado blades. The flexible strip is able to conform to the outside circumference up to the full depth of the 12-inch blade, yet is able to return to its original shape. Roller bearing brackets 30 and 32, positioned on either end of the gauge, include roller bearings 34 and 36, which are held in position by pins 38 and 40. Roller bearings 34 and 36 are located above the flexible strip and reduce friction as the flexible strip rides against the roller bearings. A stopper 42 is located on either end of the flexible strip, which would engage roller bearings 34 and 36 to prevent flexible strip from becoming removed from roller bearing brackets 30 and 32. Roller bearing brackets are positioned far enough apart to allow clearance for a 12-inch blade to pass between them, yet allow the flexible strip to function smoothly.

Depth gauge 10 functions by positioning the body 10 parallel to the saw blade with the flexible strip 28 directly over the saw blade. When the saw blade is raised, it comes into contact with the bottom of the flexible strip. The flexible strip conforms to the outside circumference of the saw blade, giving the exact arc of the saw blade. The blade is raised until the top of the flexible strip reaches the desired depth, measured by the adjustable scale. The gauge is extremely accurate, needing only an initial adjustment by positioning it with respect to the saw blade currently being used in the saw. The adjustment is made by picking a reference point on the adjustable scale, for example the one-inch mark, making a test cut in a piece of scrap, then making the necessary adjustment to the adjustable scale by loosening and tightening adjustment knob 26. The depth gauge 10 would then be set for the specific blade being used with the saw.

The depth gauge 10 allows any depth of cut desired, up to the maximum depth of a 12-inch blade. If the saw blade needs to be moved, it can quickly be readjusted to the last desired depth of cut. The depth gauge has additional uses beyond the use of a table saw, such as with circular saws. The construction of the depth gauge of the present invention is easy to use and allows for very fast and accurate blade settings for desired depth cuts.

Figure 4:
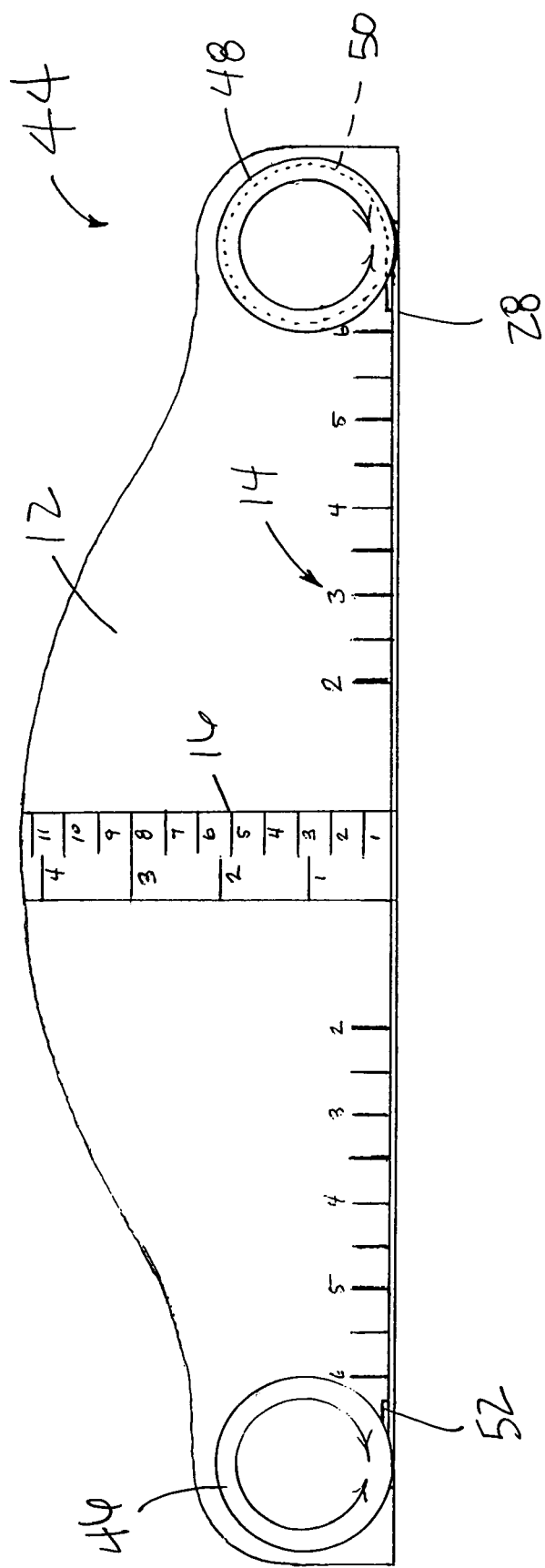
FIG. 4 is a front view of a first alternative embodiment depth gauge of the present invention.
Figure 5:
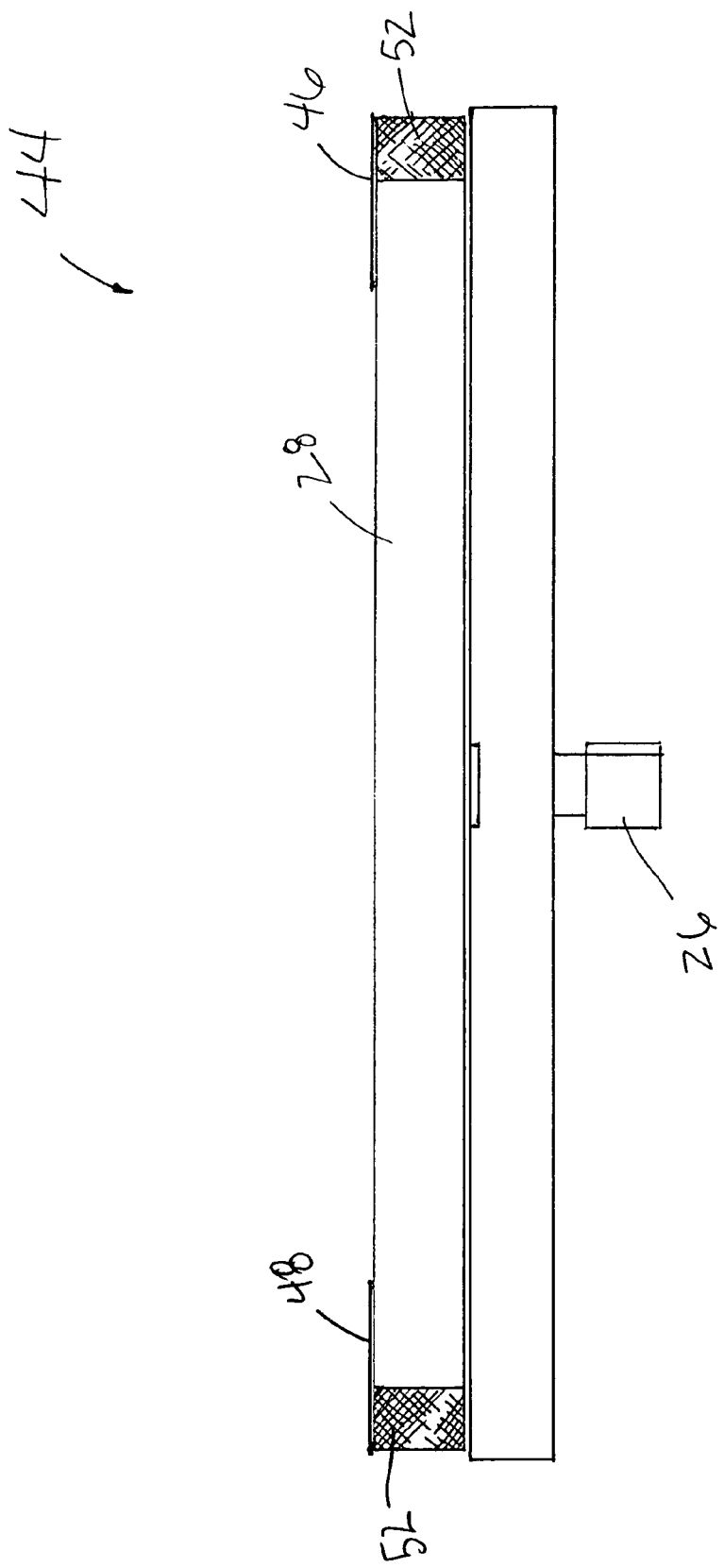
FIG. 5 is a bottom view of the depth gauge of FIG. 4.

FIGS. 4 and 5 illustrate a first alternative embodiment depth gauge 44 in accordance with the principles of the present invention. Depth gauge 44 operates under the same principles of depth gauge 10, except the flexible strip 28 incorporates two spring-loaded spools 46 and 48 to return the flexible strip to its original position. The flexible strip is long enough to effectively cover the cutting circumference of up to a 12-inch blade similar to depth gauge 10. Spools 46 and 48 are spring-loaded 50 for extension and retraction of flexible strip 28. The spring-loaded spools are positioned far enough apart to give clearance for up to a 12-inch saw blade. The flexible non-dulling strip is connected to the spool by a pliable material 52 which is coiled within the spools. Alternatively, the flexible strip itself could be of such a material allowing it to be coiled within the spools. The spool's circumference is large enough so that the pliable material 52 needs to wrap around the spool only once, yet provide ample material to allow up to a 12-inch saw blade to raise its full depth of cut.

Figure 6:
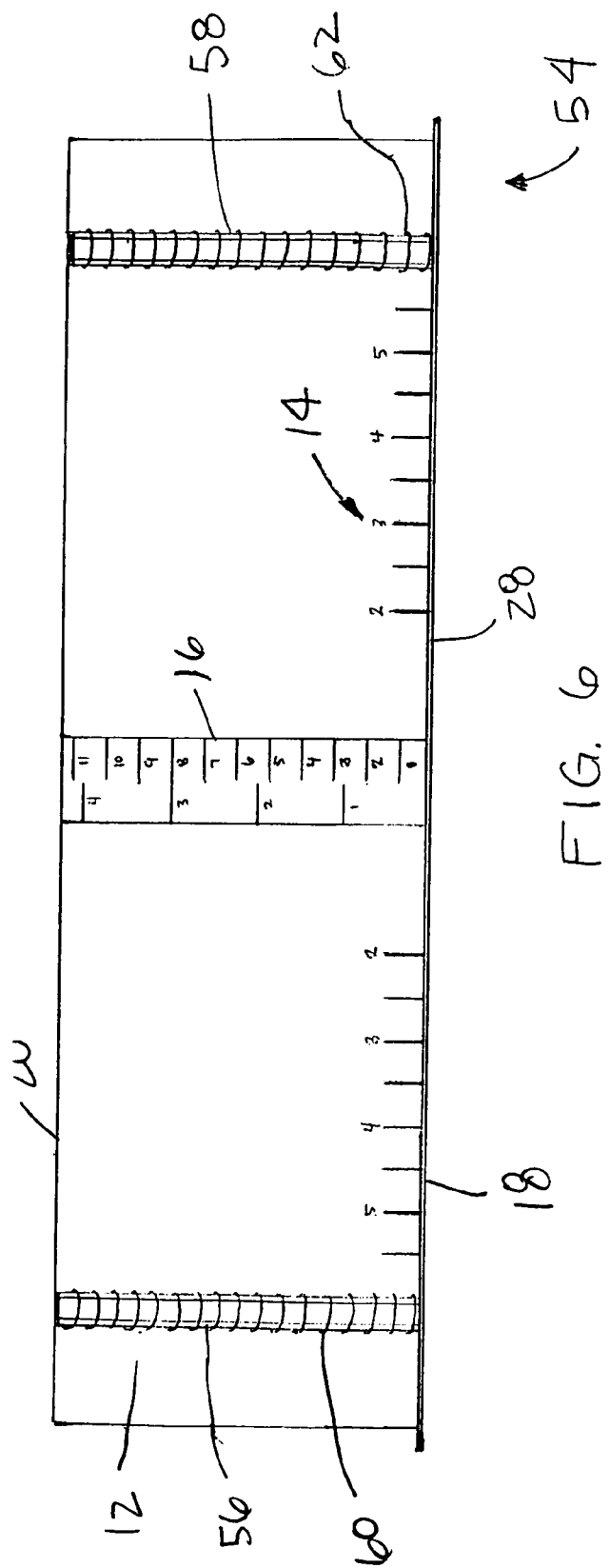
FIG. 6 is a front view of a second alternative embodiment depth gauge of the present invention.
Figure 7:
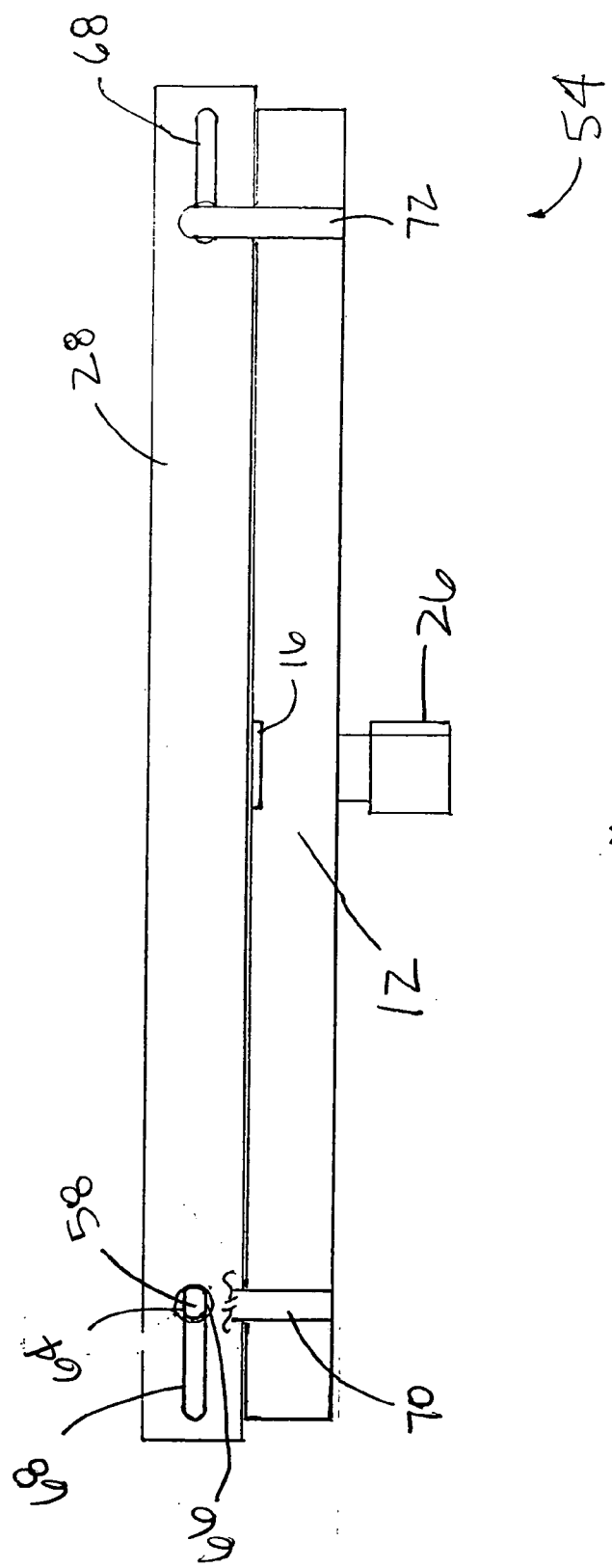
FIG. 7 is a top view of the depth gauge of FIG. 6.

FIGS. 6 and 7 illustrate a second alternative embodiment depth gauge 54 in accordance with the principles of the present invention. Depth gauge 54 operates under the same principles of depth gauge 10, however, the flexible strip 28 incorporates an alternative attachment mechanism. The flexible strip 28 is guided by two vertical metal rods 56 and 58 spaced apart wide enough to allow for clearance for up to a 12-inch blade. The flexible strip 28 is returned to its original position by a spring 60 and 62 positioned on vertical rods 56 and 58. Springs 60 and 62 provide sufficient pressure on the flexible strip 28, allowing it to conform to the circumference of the blade, and return to its original position when removed from the blade. Rods 56 and 58 each have flat surfaces 64 and 66 on opposite sides of the rod to allow the flexible strip 28 to ride smoothly up and down them via an elongated slot 68 cut into the flexible strip on either end. Rods 56 and 58 are attached to body 12 by brackets 70 and 72. A pair of brackets 70 and 72 each extend from the bottom surface 18 of the body and the top surface 20 of the body to retain the rods.

Figure 8:
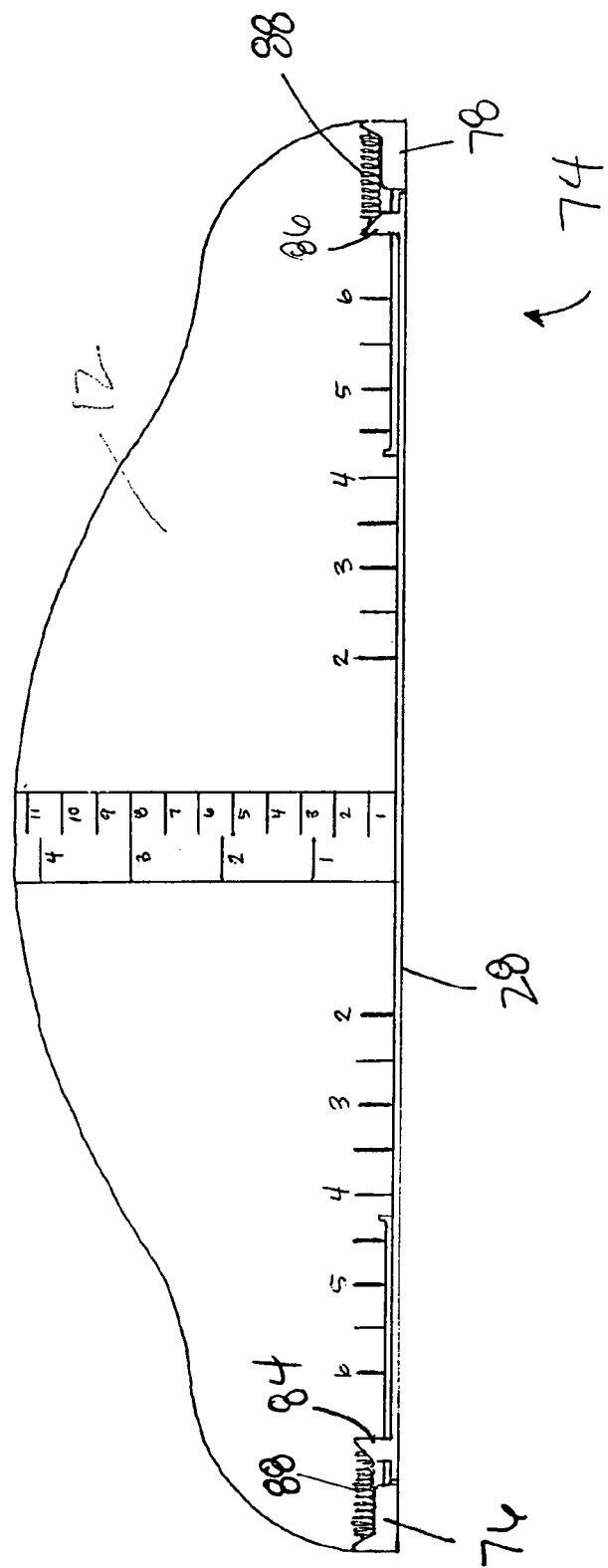
FIG. 8 is a front view of a third alternative embodiment depth gauge of the present invention.
Figure 9:
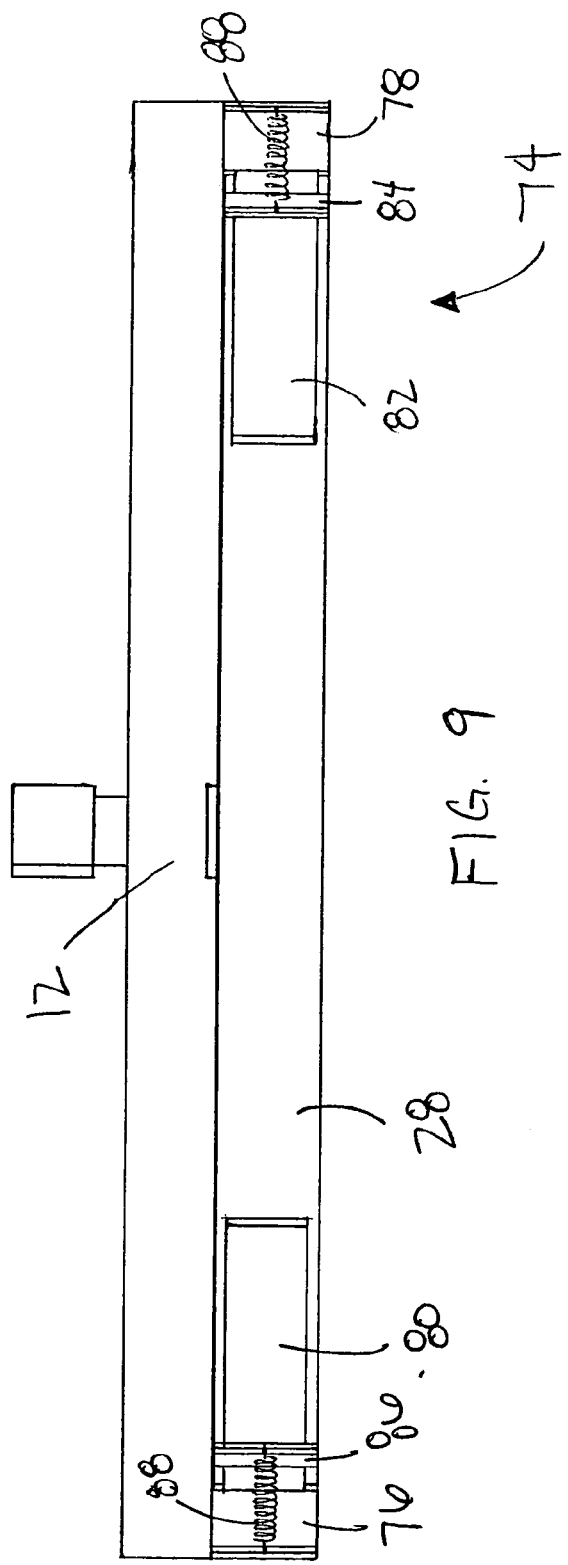
FIG. 9 is a top view of the depth gauge of FIG. 8.

FIGS. 8 and 9 illustrate a third alternative embodiment depth gauge 74 in accordance with the principles of the present invention. Depth gauge 74 operates under the same principles of depth gauge 10 except for the attachment mechanism for flexible strip 28 with respect to body 12. Flexible strip 28 is connected to body 12 by hinges 76 and 78 positioned on either end of body 12. Hinges 76 and 78 have an elongated section 80 and 82 along which flexible strip 28 travels as it is raised by a saw blade. Elongated sections 80 and 82 are long enough to allow the flexible strip to effectively cover the full cutting circumference of up to a 12-inch blade. The flexible strip 28 glides on the elongated sections via channels 84 and 86 built into each end of the top surface of the flexible strip. A spring 88 is connected between hinges 76, 78 and channels 84 and 86. The spring provides a sufficient pressure to pull the flexible strip back to its original position when it is removed from a saw blade.

Figure 10:
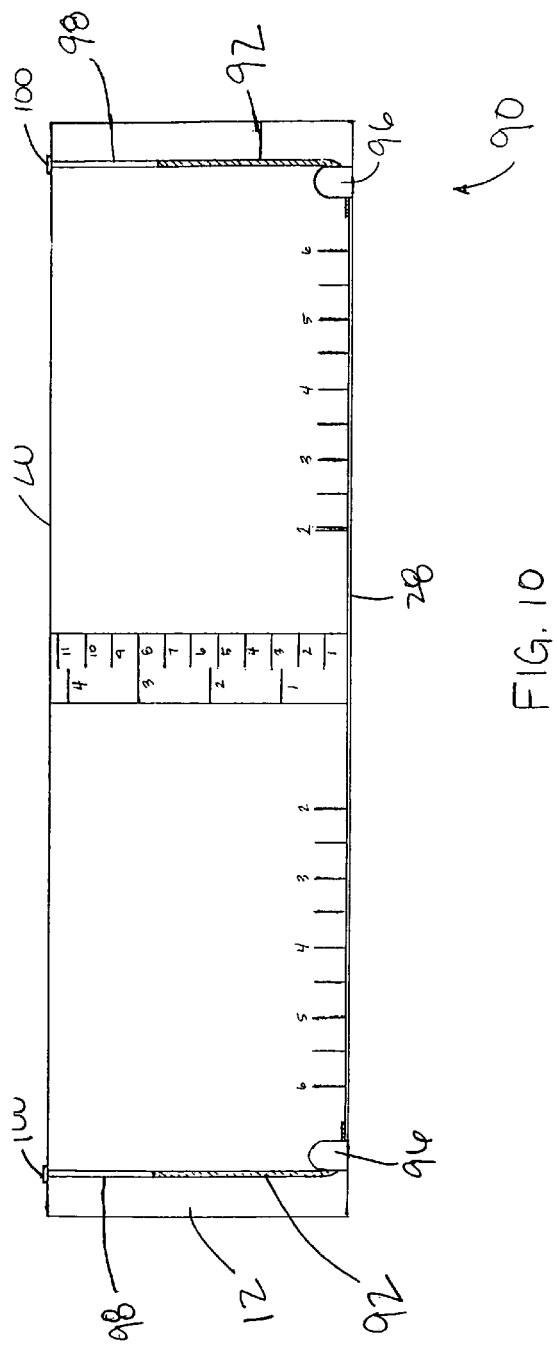
FIG. 10 is a front view of a fourth alternative embodiment depth gauge of the present invention.
Figure 11:
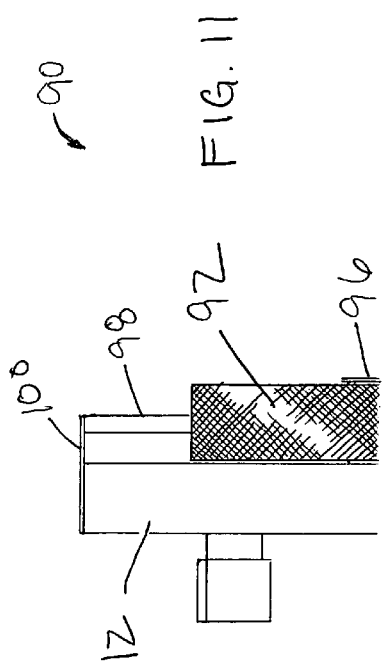
FIG. 11 is a side view of the depth gauge of FIG. 10.
Figure 12:
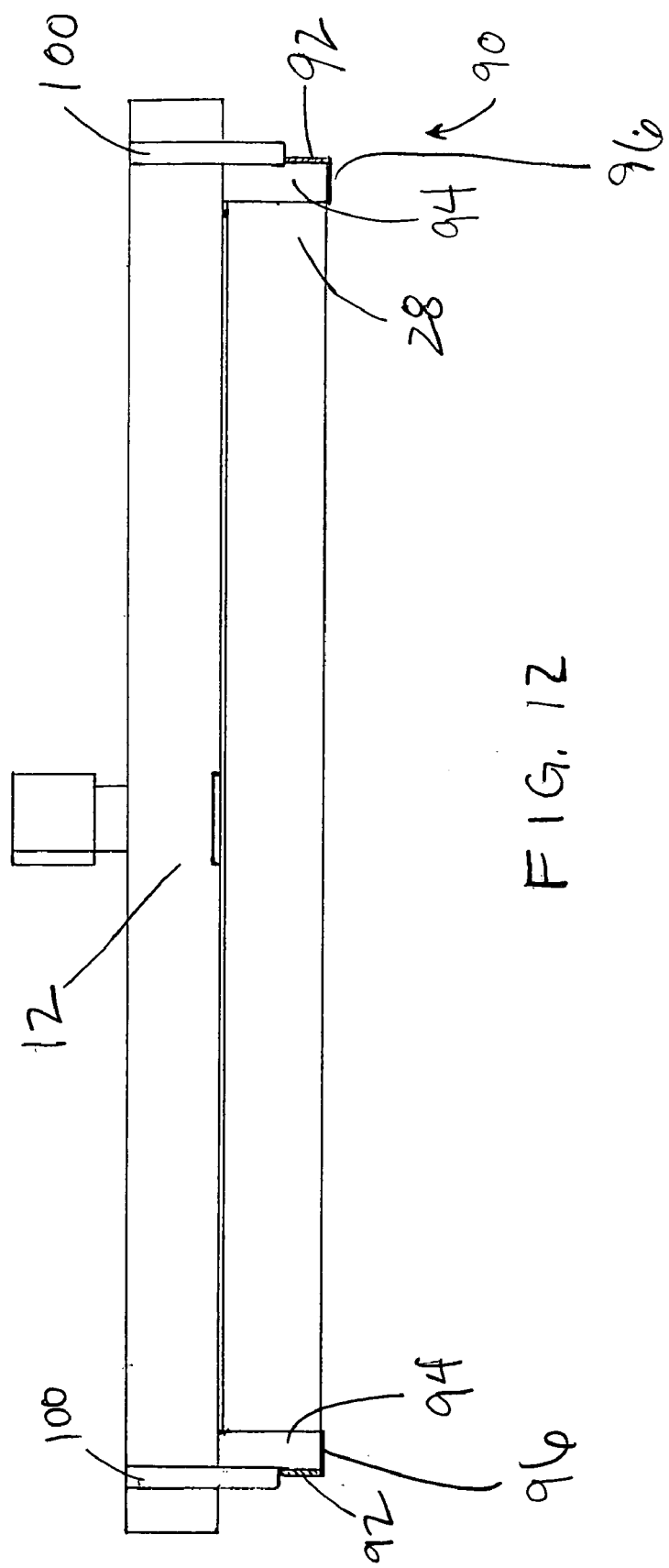
FIG. 12 is a top view of the depth gauge of FIG. 10.

FIGS. 10, 11 and 12 illustrate a fourth alternative embodiment depth gauge 90 in accordance with the principles of the present invention. Depth gauge 90 operates on the same principles as depth gauge 10, except for the incorporation of yet another attachment mechanism for flexible strip 28. Pliable material 92 is attached to both ends of the flexible strip 28. The pliable material runs under a roller bearing 94 connected to the body by a roller bearing bracket 96. Pliable material 92 is connected to a rebounding material 98, connected to supports 100, extending from the top surface 20 of body 12. The pliable material and the rebounding material allow for the flexible strip to be raised on the saw blade and retracted when removed from the saw blade.

Figure 13:
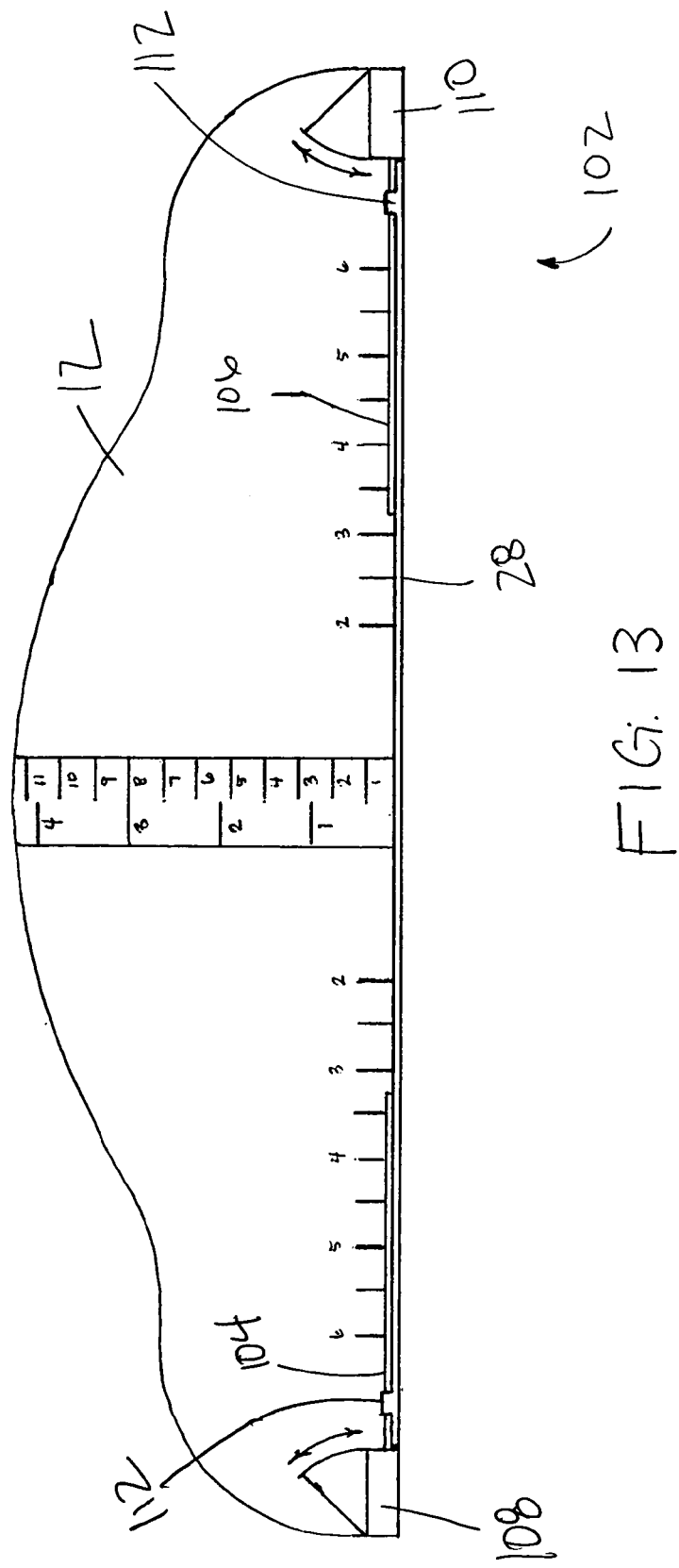
FIG. 13 is a front view of a fifth alternative embodiment depth gauge of the present invention.
Figure 14:
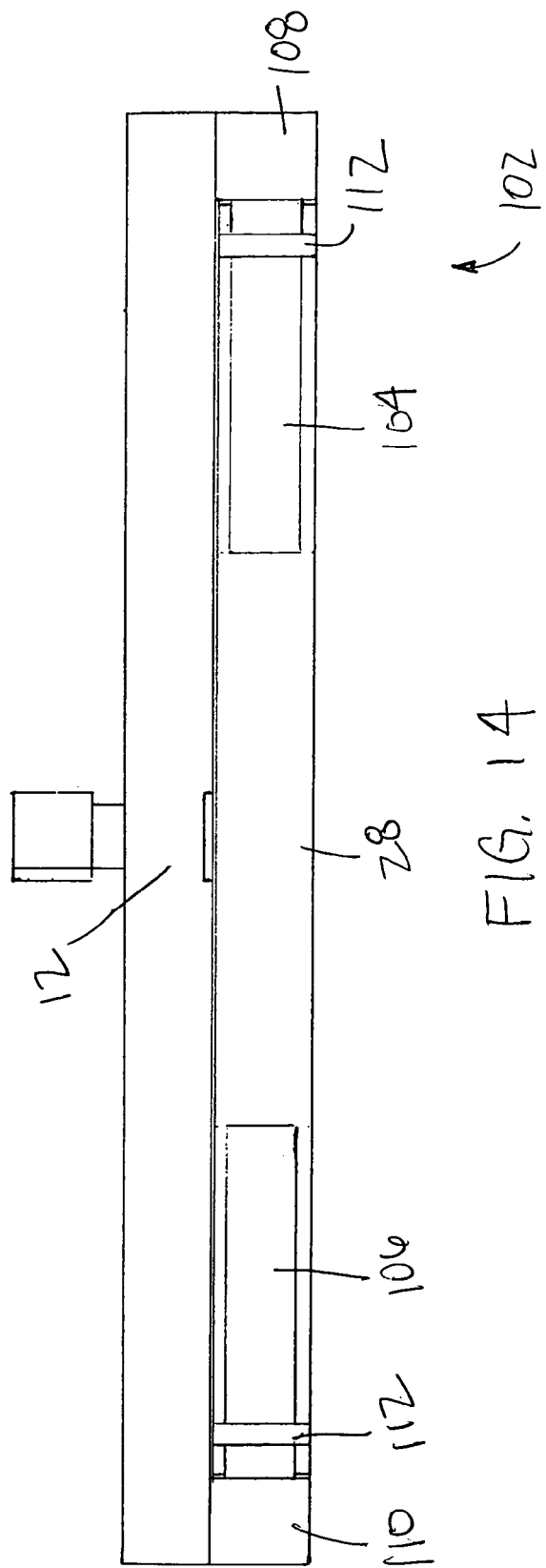
FIG. 14 is a top view of the depth gauge of FIG. 13.

FIGS. 13 and 14 illustrate a fifth alternative embodiment depth gauge 102 of the present invention. Depth gauge 102 operates under the same concepts as depth gauge 10, except for the flexible strip attachment mechanism. The flexible strip 28 glides on two guides 104 and 106 attached to spring-loaded hinges 108 and 110 positioned on either end of body 12. The flexible strip 28 glides on the guides via channels 112 built onto each end of the top surface of the flexible strip. The spring-loaded hinges are sufficient to help return the flexible strip back to its initial position upon removal of the gauge from the saw blade.

Figure 15:
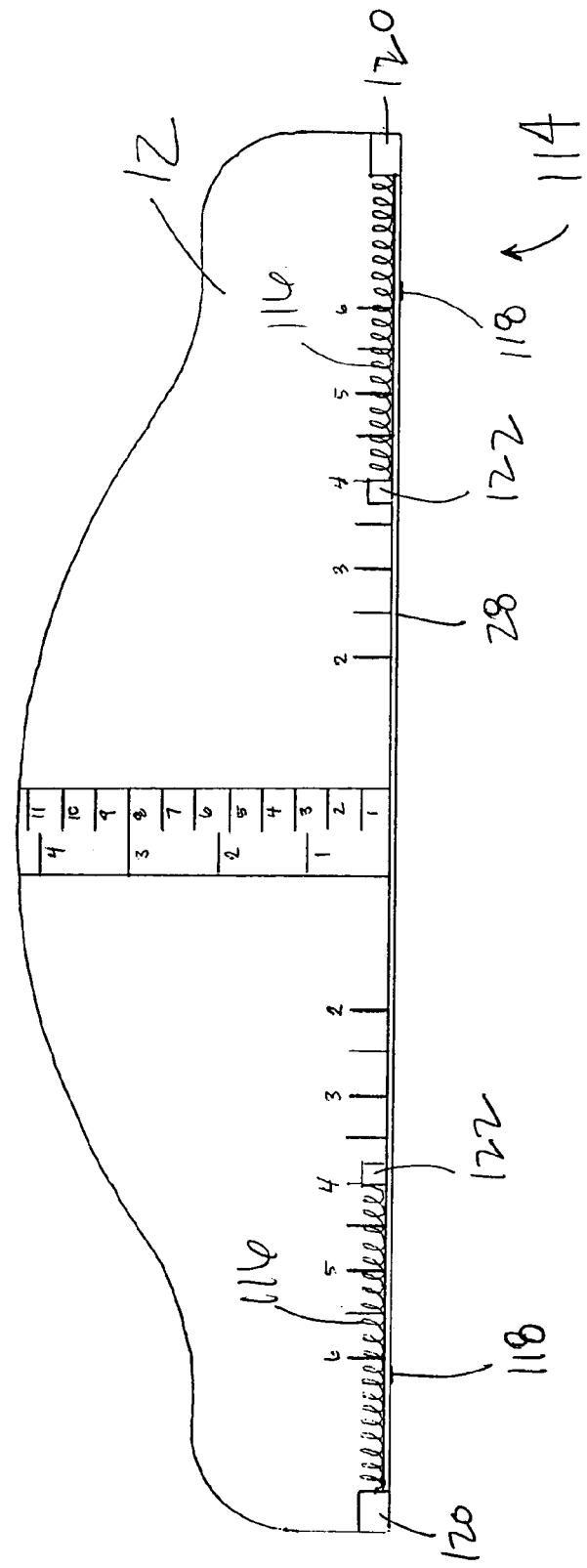
FIG. 15 is a front view of a sixth alternative embodiment depth gauge of the present invention.
Figure 16:
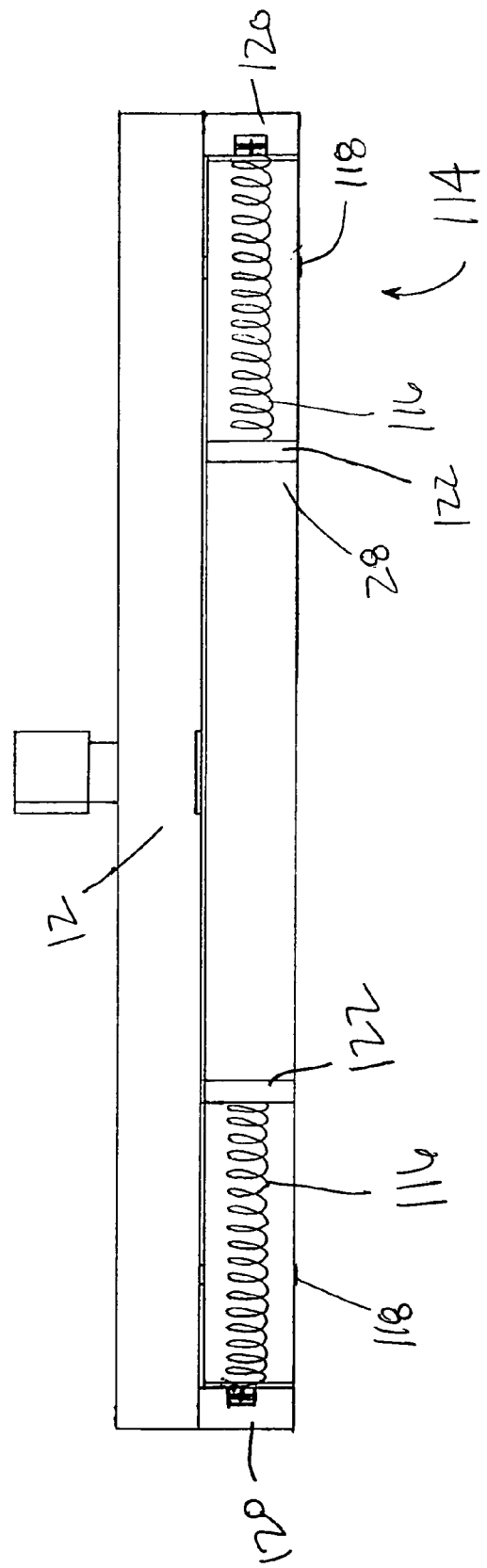
FIG. 16 is a top view of the depth gauge of FIG. 15.

FIGS. 15 and 16 illustrate a sixth alternative embodiment depth gauge 114, according to the principles of the present invention. Depth gauge 114 operates under the same principles of depth gauge 10, except for the attachment mechanism for flexible strip 28. Flexible strip 28 is attached to the body 12 by means of a spring 116 positioned on either end of the flexible strip. The flexible strip 28 is supported underneath by a support 118 connected to body 12. The spring 116 is connected to the body 12 by a body flange 120, positioned at opposite ends of the body, and to the flexible strip by a raised portion 122 on flexible strip 28. Springs 116 provide enough force to aid the flexible strip 28 to return to its original position upon removal of the gauge from a saw blade.

Figure 17:
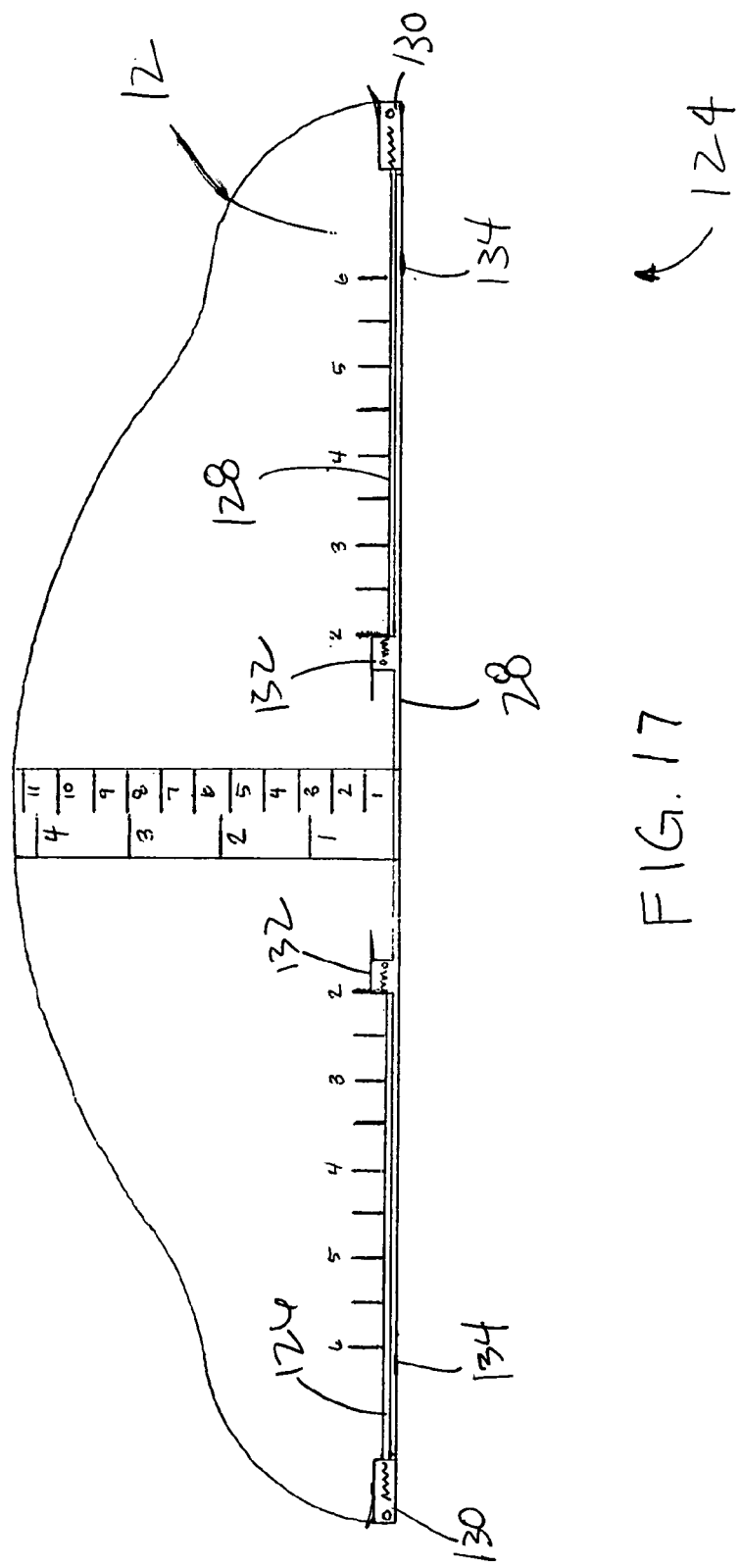
FIG. 17 is a front view of a seventh alternative embodiment depth gauge of the present invention.
Figure 18:
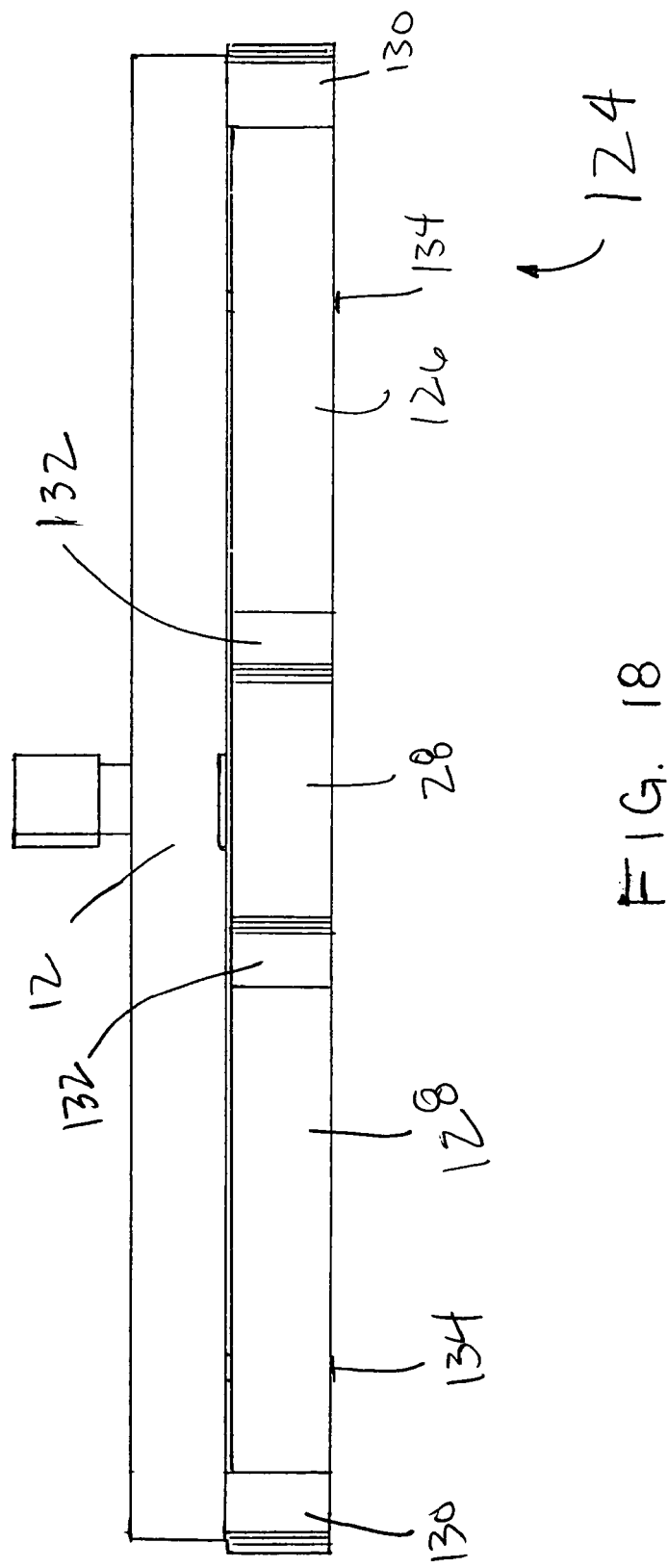
FIG. 18 is a top view of the depth gauge of FIG. 17.

FIGS. 17 and 18 illustrate a seventh alternative embodiment depth gauge 124 in accordance with the principles of the present invention. Again, depth gauge 124 operates under the same principles as depth gauge 10, except for the connection of flexible strip 28 to body 12. Depth gauge 124 is similar to depth gauge 114, however, elastic bands 126 and 128 are substituted for springs and are attached to the body 12 by spring-loaded clasps 130 positioned on either end of the body 12. The elastic bands are attached on their opposite end to spring loaded clasps 132 positioned on either end of the top surface of flexible strip 28. Flexible strip 128 is supported underneath by supports 134 positioned on either end of the body 12. The spring-loaded clasps 130, 132 anchor the elastic bands, as well as allowing the elastic bands to be adjusted as well as replaced, if needed.

Figure 19:
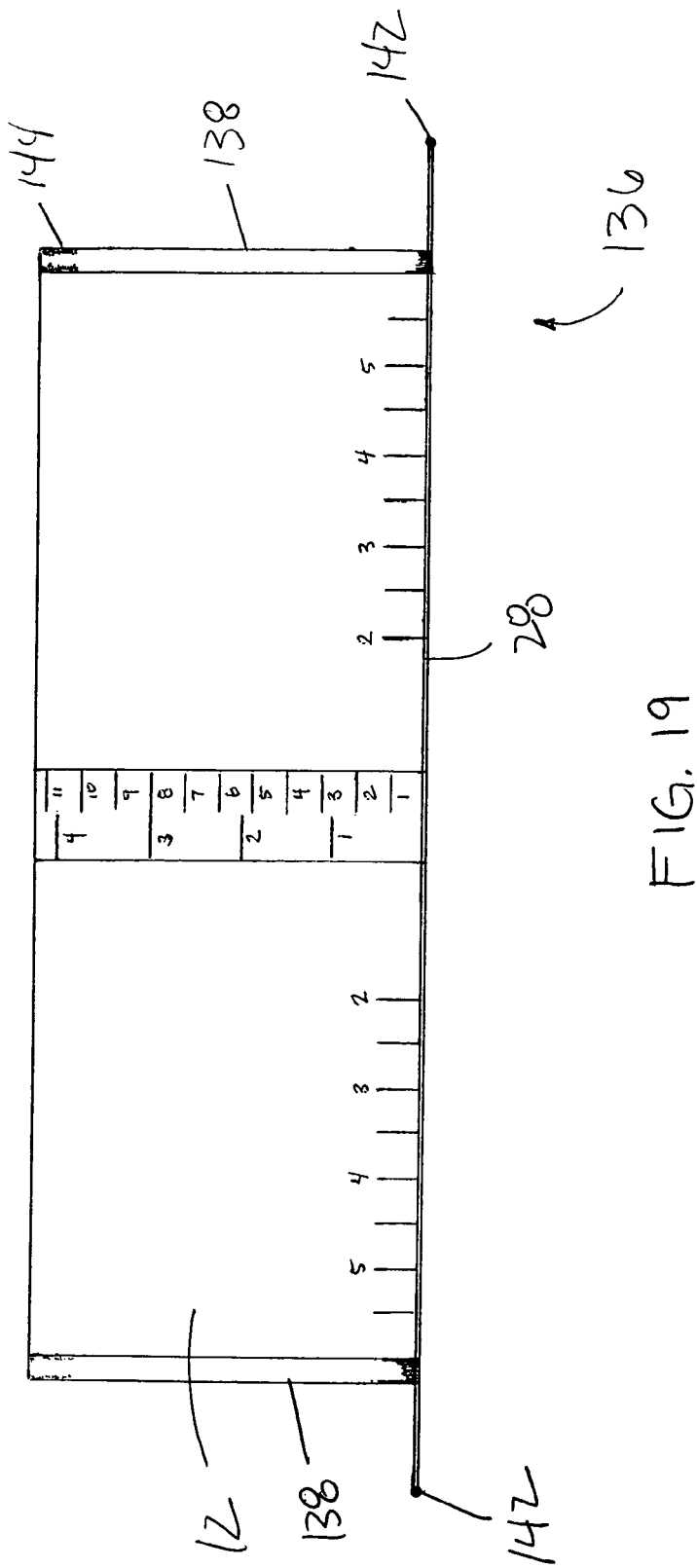
FIG. 19 is a front view of an eighth alternative embodiment depth gauge of the present invention.
Figure 20:
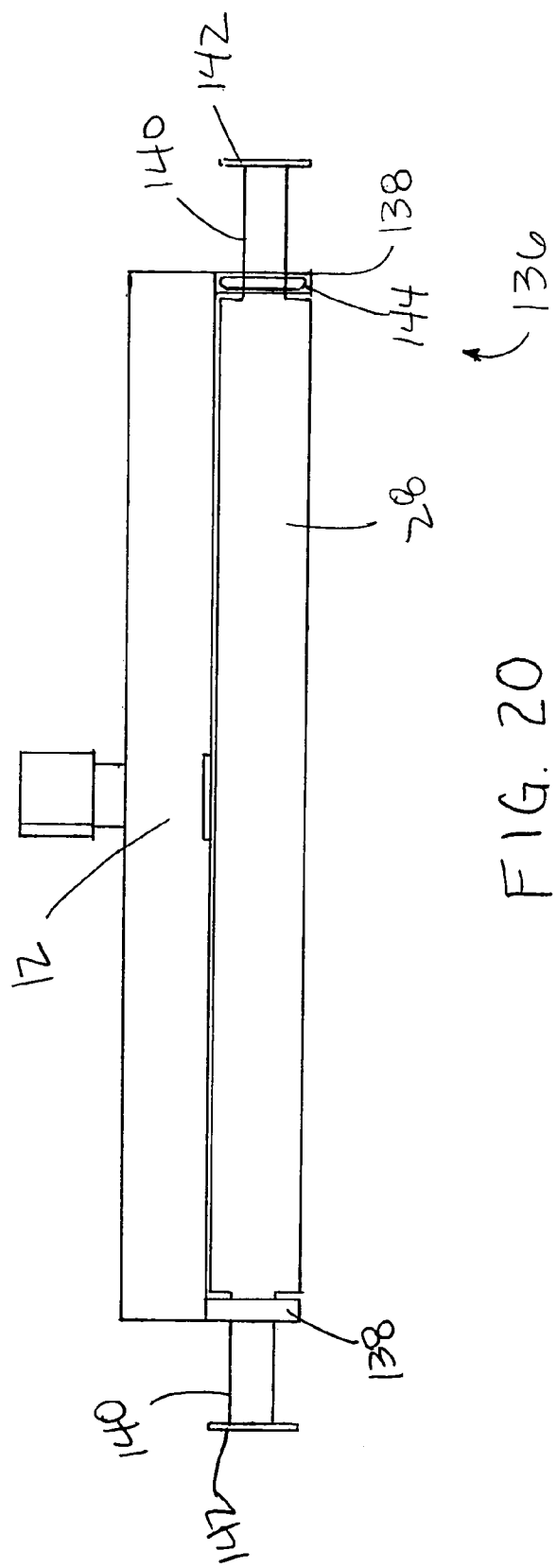
FIG. 20 is a top view of the depth gauge of FIG. 19.

FIGS. 19 and 20 illustrate a eighth alternative embodiment depth gauge 136 in accordance with the principles of the present invention. Depth gauge 136 operates under the same principles as depth gauge 10. Flexible strip 28 is attached to body 12 by a spring housing 138 located at each end of the body. The flexible strip 28 has reduced portions 140 on both ends in order to function with the spring housings 138. The flexible strip has a stopper 142 positioned at the end of each reduced portion to prevent the flexible strip from pulling through the spring housing. The spring housings 138 have a slot cut in the inside and outside of the lower housing to allow the flexible strip free vertical movement. The inside slot extends higher than the outside slot to allow the flexible strip to bend in a proper arc. A spring 144 is positioned within each spring housing and is oval or oversized to keep the spring from coming out of the slots in the housing.

Figure 21:
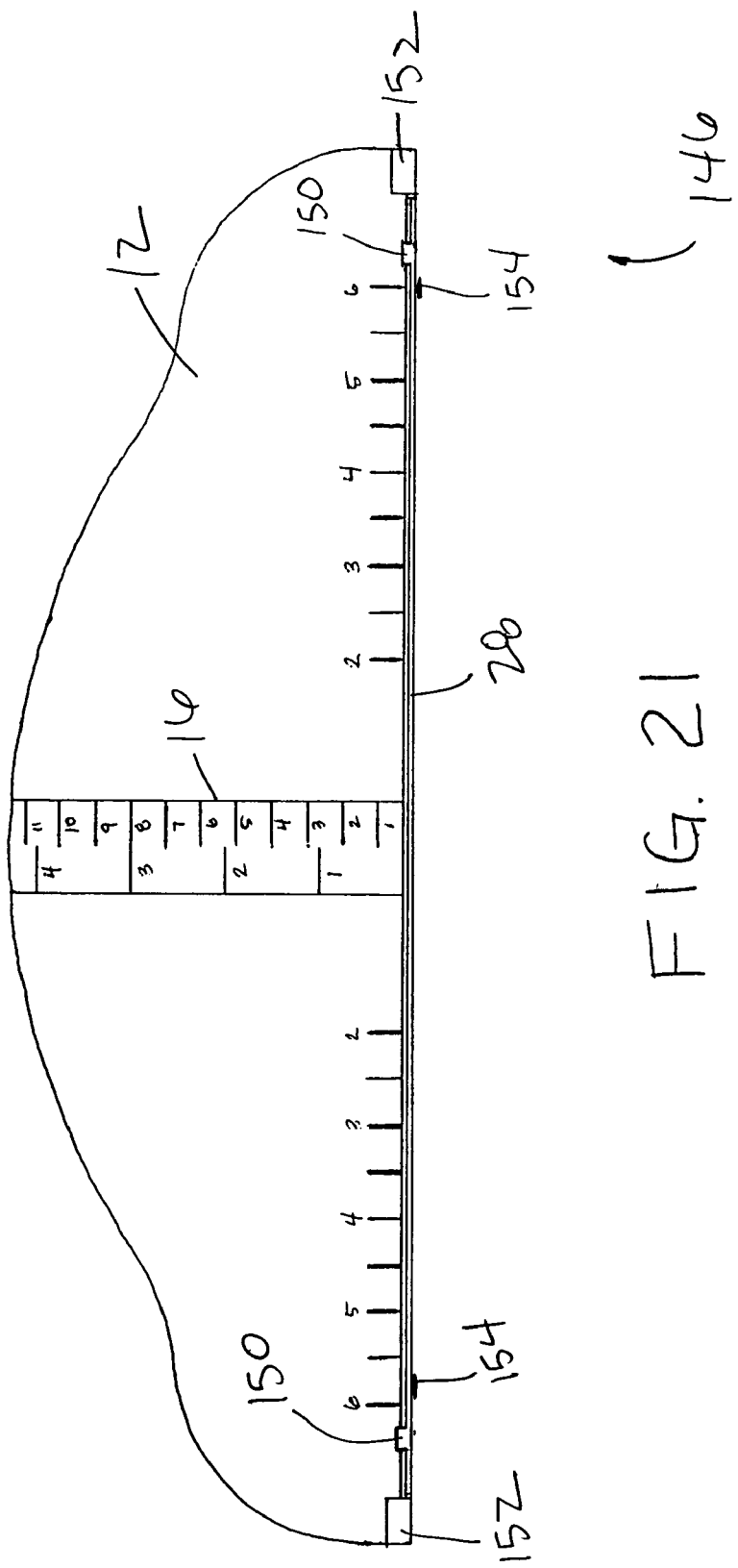
FIG. 21 is a front view of a ninth alternative embodiment depth gauge of the present invention.
Figure 22:
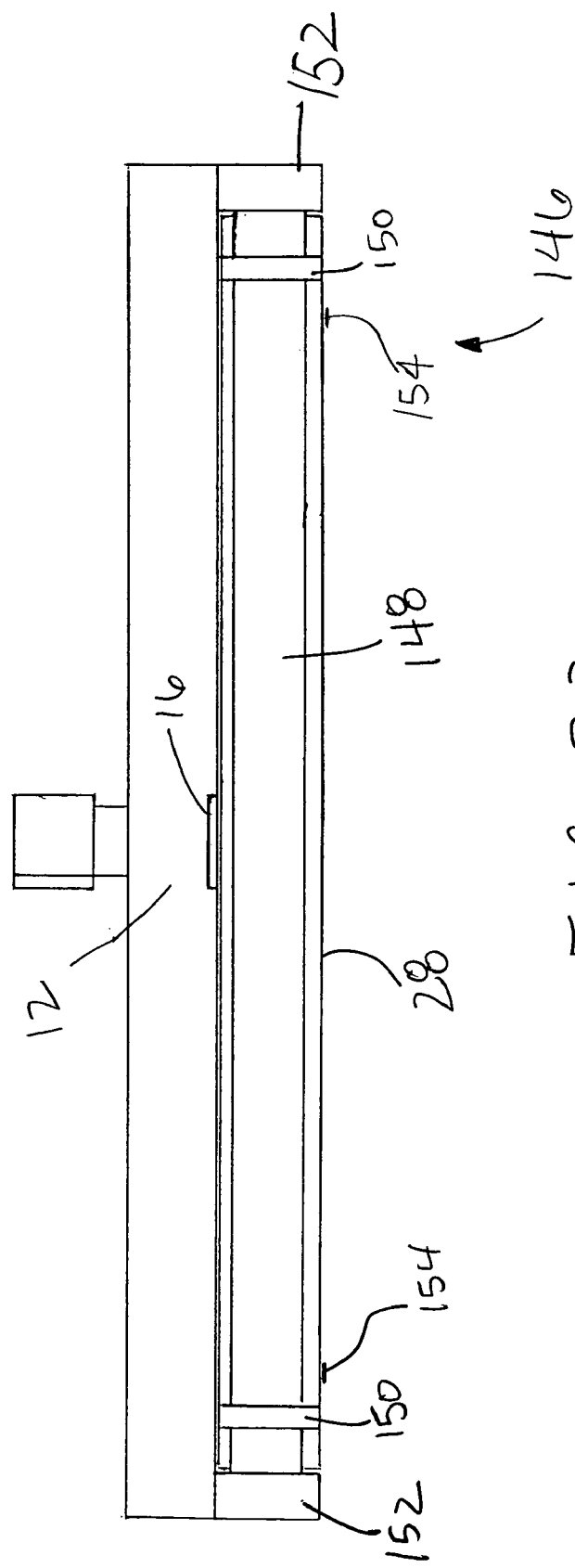
FIG. 22 is a top view of the depth gauge of FIG. 21.

FIGS. 21 and 22 illustrate a ninth alternative embodiment depth gauge 146 in accordance with the principles of the present invention. Again depth gauge 146 operates under the same principles as depth gauge 10, except the flexible strip is just long enough to effectively cover the full cutting circumference of up to a 12-inch blade. The flexible strip 28 is connected to an elastic band 148 by means of a channel 150 located on each end of the flexible strip. The elastic band 148 stretches from one end of the body though the flexible strip channels to the other end and is anchored to the body at each end by a body connector 152 positioned at each end of the body. The flexible band is slightly narrower than the flexible strip to allow the flexible strip to be seen against the vertical adjustable scale 16. The flexible strip 28 is supported underneath to the body by supports 154 positioned on either end of the body.

Figure 23:
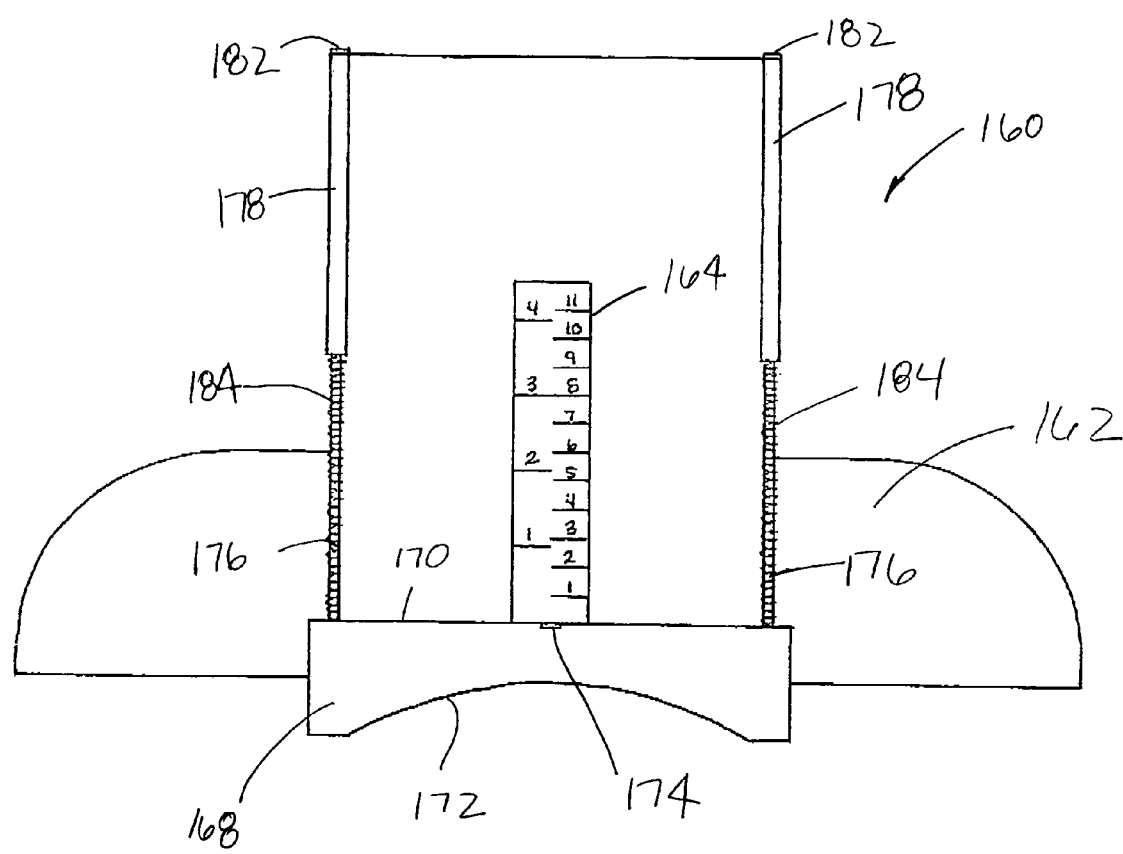
FIG. 23 is a front view of a tenth alternative embodiment depth gauge of the present invention.
Figure 24:
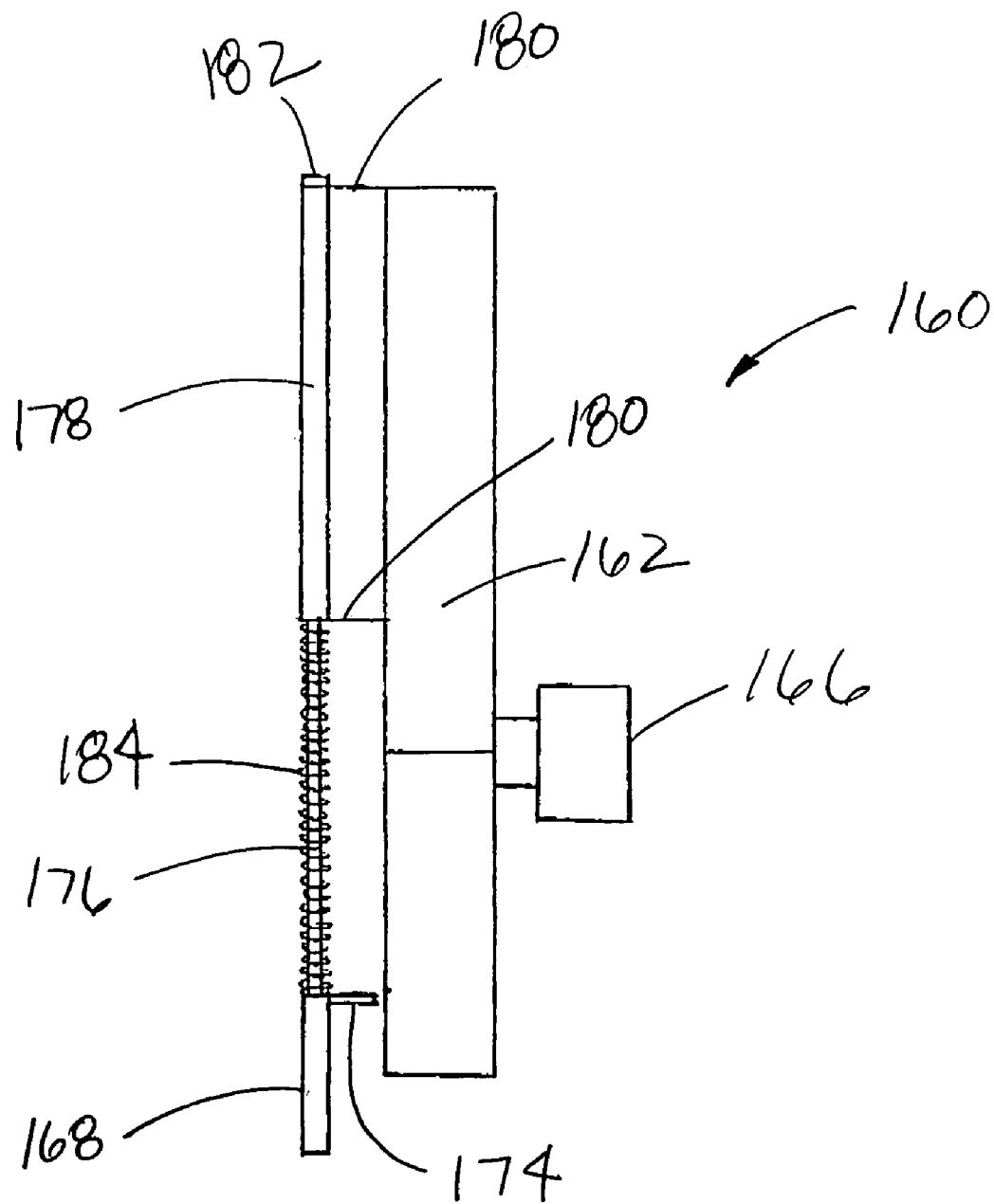
FIG. 24 is a side view of FIG. 23

FIGS. 23 and 24 illustrate a tenth alternative embodiment depth gauge 160 in accordance with the principles of the invention. Depth gauge 160 also easily and accurately measures the depth of a cut by measuring the height of the a blade above the saw table without dulling or damaging the blade. Depth gauge 160 includes a balanced stable body portion 162, having a vertical adjustable scale 164 measuring from the bottom of the gauge to the top of the gauge and is able to accommodate the full depth of a 12-inch saw blade. The adjustable scale 164 is adjusted by being positioned within a slot which extends through the body 162 to be manipulated by scale adjustment knob 166 as discussed with respect to gauge 10. A non-dulling fixed arc 168 having a flat top surface 170 and a curved bottom surface 172 is attached to body 162. Arc 168 is wide enough to accommodate a saw blade and thin enough to fit through a slot on top of the table saw allowing the arc to rest on top of the saw blade. Curved surface 172 would rest on the outer perimeter of the saw blade. The width of the arc 168 can vary depending on the type of blade used for the table saw, for example can be wider to accommodate dado blades. The flat top surface 170 includes a scale marker 174 centered along the top surface 170. Arc 168 is attached to a body 162 by rods 176 positioned on either end and rigidly attached to the arc 168. The rods are guided by and travel through cylinders 178 also attached to body 162 by brackets 180. Stoppers 182 are positioned on the top of the rods to prevent the rods from pulling out of the cylinders. A light weight spring 184 is positioned around each rod 176 between the arc 168 and the cylinder 178 allowing the arc to return to its original starting position after being removed from the saw blade.

The gauge 160 functions by placing it parallel to the saw blade with the arc sitting on the saw blade. When the blade is raised, the fixed arc rises and compresses the springs. The blade is raised until the top of the arc reaches the desired depth as measured by the scale marker 174 on vertical scale 164.

Although the present invention has been described with respect to various embodiments thereof, it is to be understood that the invention is not to be so limited since changes and modifications can be made which are within the full intended scope of the invention as hereinafter claimed.

What is claimed is:

1. A saw blade depth gauge comprising:
    a body portion having a vertical blade height scale;
    a flexible strip capable of conforming to a perimeter of a saw blade; and
    means for connecting the flexible strip to the body portion, such that the flexible strip can bend around the perimeter of the saw blade when measuring to obtain a depth measurement on the vertical scale and return to an original position upon removal from the saw blade.

2. The depth gauge of claim 1, wherein the vertical blade height scale is adjustable by moving vertically through a slot in the body portion.

3. The depth gauge of claim 1, wherein the means for connecting the flexible strip to the body portion is at least one roller bearing bracket and a roller bearing connected to the body portion.

4. The depth gauge of claim 1, wherein the means for connecting the flexible strip to the body portion is at least one spring-loaded spool connected to the body portion and the flexible strip.

5. The depth gauge of claim 1, wherein the means for connecting the flexible strip to the body portion is at least one rod and spring assembly connected to the body and an elongated slot extending through the flexible strip.

6. The depth gauge of claim 1, wherein the means for connecting the flexible strip to the body portion is at least one spring-loaded guide and a channel on the flexible strip.

7. The depth gauge of claim 1, wherein the means for connecting the flexible strip to the body portion is at least one support and bearing assembly on the body portion and a rebounding material connected to the flexible strip.

8. The depth gauge of claim 1, wherein the means for connecting the flexible strip to the body portion is a spring positioned between the body portion and the flexible strip.

9. The depth gauge of claim 1, wherein the means for connecting the flexible strip to the body portion is an elastic band positioned between the body portion and the flexible strip.

10. The depth gauge of claim 1, further comprising a blade centering scale positioned along a lower surface of the body portion.

11. A height indication device for a saw blade comprising:
a body having a height scale;
a flexible height indicator; and
means for flexibly connecting the flexible height indicator to the body such that the saw blade flexes the flexible height indicator during a measurement condition.

12. The height indication device of claim 11, wherein the height scale is adjustable by movement through a slot in the body portion.

13. The height indication device of claim 11, wherein the means for flexibly connecting the height indicator to the body is at least one roller bearing bracket and a roller bearing connected to the body.

14. The height indication device of claim 11, wherein the means for flexibly connecting the height indicator to the body is at least one spring-loaded spool connected to the body portion and the height indicator.

15. The height indication device of claim 11, wherein the means for flexibly connecting the height indicator to the body is at least one rod and spring assembly connected to the body and an elongated slot extending through the height indicator.

16. The height indication device of claim 11, wherein the means for flexibly connecting the height indicator to the body is at least one spring-loaded guide on the body and a channel on the height indicator.

17. The height indication device of claim 11, wherein the means for flexibly connecting the height indicator to the body is at least one support and a bearing assembly on the body and a rebounding material connected to the height indicator.

18. The height indication device of claim 11, wherein the means for flexibly connecting the height indicator to the body is a spring position between the body and the height indicator.

19. The height indication device of claim 11, wherein the means for flexibly connecting the height indicator to the body is an elastic band positioned between the body and the height indicator.

20. The height indication device of claim 11, further comprising a blade centering scale, positioned along a lower surface of the body.

21. A saw blade depth gauge comprising:
a body portion having a vertical height scale;
a rigid arc sized to accommodate a perimeter of a saw blade, the arc being movably connected to the body portion; and
means to guide travel of the arc with respect to the body portion to measure a height of the saw blade along the vertical height scale.

22. The gauge of claim 21 wherein the means to guide travel is at least one spring biased post positioned between the arc and the body portion.

23. The gauge of claim 22 wherein the post travels through a cylinder.

* * * * *